March 30, 1943.  F. M. HILDEBRANDT  2,315,423
MANUFACTURE OF FERMENTATION GLYCERINE FROM MOLASSES
Filed Feb. 14, 1941
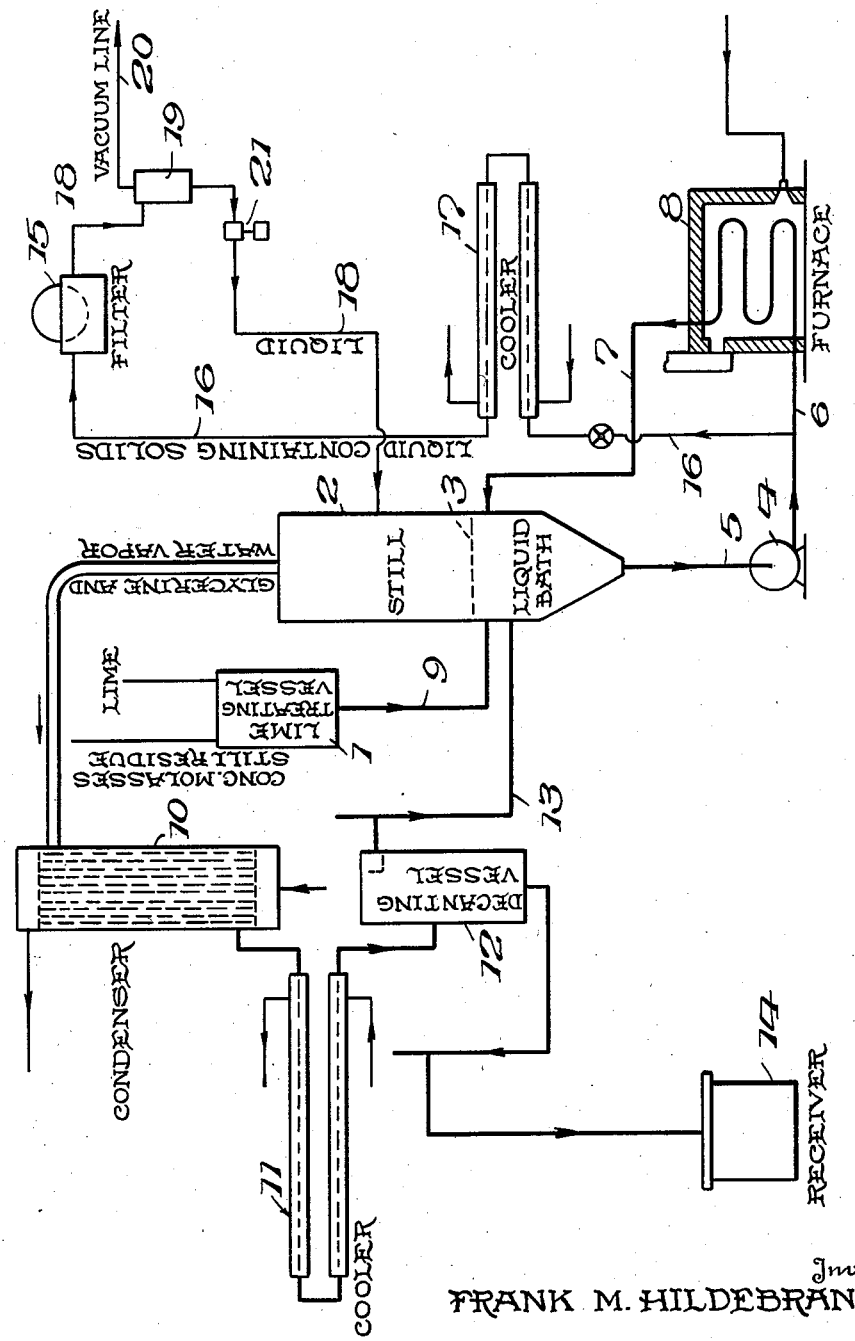
Inventor
FRANK M. HILDEBRANDT
Attorney Patented Mar. 30, 1943

2,315,423

UNITED STATES PATENT OFFICE 2,315,423

MANUFACTURE OF FERMENTATION GLYCERIN FROM MOLASSES

Frank M. Hildebrandt, Baltimore, Md., assignor to U. S. Industrial Alcohol Co., New York, N. Y., a corporation of West Virginia Application February 14, 1941, Serial No. 378,885

3 Claims. (Cl. 202—57)

The still residue, distillery waste, or slop, from ethyl alcohol distillation of yeast fermentations of molasses ordinarily contains glycerin in an amount representing about 3% of the fermented molasses sugar. This glycerin has been lost for want of a practical method of recovering it. It has also been known that yeast fermentations can be conducted in such manner that less alcohol and more glycerin will be formed and that the glycerin may readily be increased to 14% of the sugar fermented or even to higher percentages under special conditions; but again the glycerin has not been commerciably recoverable from molasses ethyl alcohol still residues.

In Germany, during the previous general war, fermentation glycerin was manufactured from fermentation solutions made up of pure sugar and nutrient salts without regard to raw material cost. The glycerin could be recovered with fair success because of the absence of interfering substances.

Molasses is a cheap raw material, but it contains a variety of organic bodies, volatile and non-volatile, which have made it impractical to manufacture glycerin, on a commercial scale, from this source.

The organic non-volatiles (solids) in solution or suspension in the still residues remaining after distilling off the ethyl alcohol from the fermented molasses obstruct the separation of the glycerin by subsequent distillation procedures. In my copending application, Serial No. 378,884, filed February 14, 1941, a continuation in part of application Serial No. 235,696, filed October 18, 1938, I have claimed a process whereby the molasses solids are conditioned and the glycerin is flashed off from these residual solutions by introducing the same into a body of heat-transfer liquid, preferably mineral oil, maintained at a temperature above 190° C. and not so high as to cause any great decomposition of the glycerin.

The distillate from this operation is dilute glycerin (sweet-water) containing considerable amounts of organic impurities from the molasses or molasses-conversion products. These substances occasion difficulty, loss and expense when it comes to concentrating and purifying the sweet-water.

Now I have found that the quality of the glycerin-containing distillate can be greatly improved and subsequent purification can be facilitated by treating the molasses ethyl still-residue with quick-lime before the residue is fed to the bath of heat-transfer liquid.

The still-residue is preferably first concentrated to about fifty per cent. solids content. From 1%–5% of quick-lime is then added slowly to the concentrate, while the latter is brought to boiling and stirred to incorporate the lime thoroughly into the mass. The lime added to the still residue combines with the organic acids always present and thus prevents the formation of esters during the heat treatment necessary to flash off the glycerin. The formation of empreumatic substances is also lessened. Furthermore, the lime forms calcium compounds which are not fusible at the temperature of the hot bath.

This treated concentrate is fed continuously to a body of heat-transfer liquid, the glycerin and some other organic substances being flashed off with the water and condensed, and the solids being removed from the bath. The bath temperature is of the order of 190°–280° C. and preferably of the order of 230°–280° C., a desirable temperature being 250° C.

The best improvement in the quality of the glycerin-containing distillate, with view to later purification, is obtained when sufficient lime is added to the still-residue or its concentrate, to make the solution neutral or slightly alkaline.

While quick-lime is preferred, an equivalent of slaked lime may be used. If slaked lime (milk of lime) is used, the content of $Ca(OH)_2$ will be of the order of 1% to 6% of the concentrated residue.

The accompanying drawing is a diagrammatic illustration of apparatus for carrying out the invention.

Molasses still residue, or slop, concentrated to about 50% solids content, is treated with lime in a lime-treating vessel 1 to give the lime-treated fermentation solution which subsequently is heat treated to recover glycerin or lactic acid therefrom.

A treating vessel or still 2 contains a body of heat-transfer liquid 3, which is circulated by a pump 4 through pipes 5, 6, 7 from the treating vessel to a heating coil in a furnace 8, and back to the vessel.

The lime-treated molasses still-residue from the vessel is introduced into contact with the hot bath through a pipe 9. The feed is preferably injected into the bath at a substantial distance below the surface of the latter. It is not necessary to provide special means for spraying or atomizing the feed solution, since the explosive effect of sudden vaporization breaks it up into small droplets, with the result that the solids separate in fine particles.

The bath liquid should be one that is substantially heat-stable, substantially non-miscible with water, substantially a non-solvent of the solids, substantially non-reactive with the constituents of the feed, and has a boiling point higher than the temperature at which the flash distillation is effected. For the recovery of glycerin or lactic acid it should be substantially immiscible with the product in question. It should have a specific gravity such that the solids produced do not float on top of the bath but settle or remain in the body of the liquid in order that their removal may be accomplished in the manner described. A mineral oil is preferred. An oil that has been found satisfactory has the following characteristics:

Initial boiling point at atmospheric
   pressure _____ 305° C.
50% _____ 337° C.
End point _____ 377° C.
Gravity _____ 0.874 at 30° C.

In the case of still-residue, the vapors of glycerin and water are flashed off on contact of the feed with the hot oil, and enter the condenser 10 at a temperature upwards of 180° C., and preferably upwards of 200° C. The condensate goes through the cooler 11 into the decanting vessel 12. The upper layer consisting of oil is put back into the treating vessel 2 through pipe 13, and the lower layer, which contains the water of the feed together with the glycerin and certain impurities, is drawn from the decanter to the receiver 14, to be subsequently concentrated and purified in any desired manner.

The solids, conditioned in the treating vessel 2 as heretofore described, may be removed from the vessel and freed of the bath liquid in a number of ways. Much advantage, however, is realized by drawing off a small side stream of the liquid, carrying the solids in suspension, to a filter 15, preferably of the continuous, rotary, vacuum type. This stream, which does not pass through the furnace, may be taken off from the pipe 6 at a point between the main circulating pump 4 and the furnace. It passes through a valved line 16 and a cooler 17 to the filter, from which the clear liquid returns to the still or treating vessel through a line 18, a receiver 19 having a vacuum connection 20, and a pump 21. This method of withdrawing solids results in a build-up of solids in the bath liquid circulating through the still until an equilibrium is reached, at which the solids are withdrawn at the same rate as they are formed. The value per minute of the side stream need be no greater than 5% of the total oil circulated.

The solid product, when freed of bath liquid in the filter or otherwise, is a dark, substantially non-hygroscopic powder, containing on the dry basis about 14% to 15% potash and about 2.25% nitrogen. This end-product has been shown by actual tests to be a valuable fertilizer ingredient. When mixed with other materials, mainly phosphates, it becomes a complete fertilizer.

In the treatment of molasses lactic-acid fermentation solutions, the lactic solution is fed through the pipe 9, the vapors of lactic acid and water are flashed off and go to the condenser 10, the residual molasses solids are conditioned in the bath, and when removed and freed of the heat-transfer liquid constitute a solid product similar to that from the ethyl alcohol still-residue or slop. It is desirable to supply a small current of superheated steam to sweep the lactic acid vapors out of the vessel 2.

I claim:

1. The process of treating a molasses fermentation solution which contains glycerin, organic acids and a substantial proportion of solid substances that tend to agglomerate and to adhere to surfaces of apparatus and pipes of treating equipment causing clogging and local overheating, which process comprises treating such fermentation solution with lime, introducing the lime-treated fermentation solution into a vessel containing a body of heat transfer liquid that has a boiling point higher than the temperature used in the process and that is non-reactive with said solution, the amount of lime with which the fermentation solution is treated being sufficient to combine with at least a substantial portion of the organic acids present in the solution and thereby substantially lessen the formation of esters when the solution is introduced into the vessel, flashing off glycerin from the lime-treated solution and changing the contained solids into non-agglomerating, non-adherent finely-divided material by mixing said solids with the liquid in the vessel and maintaining the temperature of the liquid above 190° C., removing the changed solids from said vessel with a portion of the heat transfer liquid, and subsequently separating the solids from the heat transfer liquid to secure a product that is fertilizer material.

2. The process of treating a molasses fermentation solution as described in claim 1 in which the heat transfer liquid is an organic liquid and is maintained at a temperature between 190° and 280° C.

3. The process of heat treating a molasses fermentation solution containing glycerin, organic acids and a substantial proportion of solid substances that tend to agglomerate and to ahere to surfaces of apparatus and pipes of treating equipment causing clogging and local overheating, which process comprises the following steps: treating such fermentation solution with lime, introducing the lime-treated fermentation solution into a vessel containing a body of organic heat transfer liquid non-reactive with the fermentation solution and having a boiling point higher than the temperature of the process, said heat transfer liquid being maintained at a temperature sufficiently high to flash off the volatiles and to put the solids into a non-agglomerating and non-adhesive condition, the amount of lime with which the fermentation solution is treated being sufficient to combine with at least a substantial portion of the organic acids present in the solution and thereby substantially lessen the formation of esters when the solution is introduced into the vessel, flashing off glycerin and other volatiles boiling above the boiling point of water, recovering the flashed-off materials by condensation, removing the physically changed solids from the treating vessel with a portion of the heat transfer liquid, and subsequently separating the solids from the heat transfer liquid to secure a product that is a fertilizer material.

FRANK M. HILDEBRANDT.